United States Patent
Bartel

(10) Patent No.: US 6,189,910 B1
(45) Date of Patent: Feb. 20, 2001

(54) RETRACTABLE TRAILER HITCH

(75) Inventor: James J. Bartel, Commerce, MI (US)

(73) Assignee: Transportation Design & Manufacturing Co., Livonia, MI (US)

( * ) Notice: Under 35 U.S.C. 154(b), the term of this patent shall be extended for 0 days.

(21) Appl. No.: 09/304,477

(22) Filed: May 3, 1999

(51) Int. Cl.[7] .................................................. B60D 1/01
(52) U.S. Cl. ................................. 280/491.2; 280/491.1; 280/495; 280/500; 280/511
(58) Field of Search ............................. 280/491.1, 491.2, 280/491.5, 495, 500, 511

(56) References Cited

U.S. PATENT DOCUMENTS

| | | | |
|---|---|---|---|
| 2,544,185 | * 3/1951 | Sargent | 280/33.44 |
| 2,612,384 | * 9/1952 | Wiegman | 280/33.44 |
| 2,671,674 | 3/1954 | Derksen . | |
| 2,838,327 | 6/1958 | Collins . | |
| 2,889,155 | 6/1959 | Sandage . | |
| 2,914,343 | 11/1959 | Roth . | |
| 3,385,610 | 5/1968 | Vezina . | |
| 3,437,355 | 4/1969 | Jeffes . | |
| 4,169,611 | 10/1979 | Smith et al. . | |
| 4,482,167 | 11/1984 | Haugrud . | |
| 4,662,647 | 5/1987 | Calvert . | |
| 5,242,186 | * 9/1993 | Pettersson | 280/511 |
| 5,322,315 | 6/1994 | Carsten . | |
| 5,431,425 | 7/1995 | Klinkman . | |
| 5,527,055 | * 6/1996 | Breslin | 280/504 |
| 5,727,805 | 3/1998 | La Roque . | |
| 5,860,671 | * 1/1999 | Mackeown | 280/511 |
| 5,906,387 | * 5/1999 | Wallace | 280/491.3 |

* cited by examiner

Primary Examiner—Brian L. Johnson
Assistant Examiner—Deanna Draper
(74) Attorney, Agent, or Firm—Young & Basile, P.C.

(57) ABSTRACT

A trailer hitch includes a cylindrical receiver perpendicularly mounted on a horizontal laterally extending tube attached to a vehicle. The receiver carries a slider movable between a first, retracted position substantially entirely disposed beneath the vehicle bumper and a second, extended position wherein the slider projects rearwardly of the vehicle bumper and carries a hitch ball for attachment to a towed object. A cam slot and cam follower are cooperatingly formed on the slider and the receiver, with the cam slot having angularly disposed ends for rotation of the slider between first and second angularly disposed position simultaneous with translation of the slider between first and second retracted and extended positions. A decorative cover overlays the exposed portions of the horizontal tube and the slider when the slider is in the retracted position. A movable member or members carried on the cover are movable to a position exposing access to the slider for movement of the slider between the extended and retracted positions.

7 Claims, 3 Drawing Sheets

RETRACTABLE TRAILER HITCH

BACKGROUND OF THE INVENTION

1. Field of the Invention

The present invention relates, in general, to towing or trailer hitches.

2. Description of the Art

Trailer hitches typically include a rigid frame work with a coupling structure having a hitch ball mounted therein for attachment to a mating ball socket on a trailer, mating hitch, etc. The hitch is usually semi-permanently attached to the rear of a towing vehicle by means of a horizontal tube which is secured by bolts, welds, etc., to the vehicle bumper or vehicle body structure. Aligned apertures are formed in the horizontal bar, typically centered on the longitudinal axis of the vehicle when the horizontal bar is mounted on the vehicle, to receive a longitudinally extending bar carrying the hitch ball at one end. A safety chain and a lock pin are typically associated with the longitudinal bar for releasibly mounting the bar to the horizontal tube.

When not attached to a towed vehicle, the hitch ball projects rearwardly from the vehicle bumper. This creates a potentially hazardous obstacle which can cause painful injury to an individual walking behind the vehicle in close proximity to the bumper.

To illuminate this problem, as well as during lengthy time periods where the hitch is not expected to be used, the slide bar and the hitch ball are removed from the horizontal tube on the vehicle. However, due to the relatively small size of the slide bar and the hitch ball, it is common for the user to forget where he or she placed the slide bar when the hitch is to be used again.

In order to circumvent these problems, trailer hitches have been devised in which the slide bar and hitch ball are permanently attached to the horizontal tube; but are movable between an extended use position rearward of the vehicle bumper and a storage position under the vehicle body or bumper and not extending outward a significant distance beyond the vehicle bumper. Such so-called "retractable trailer hitches" are constructed to move the slide bar and hitch ball in a horizontal, longitudinal direction between the storage and extended, use positions, laterally through a horizontal plane in which the slide bar may be disposed at any angle with respect to the longitudinal centerline of the vehicle, as well as vertically pivotal about a horizontal, laterally extending axis parallel to the horizontal tube in which the slide bar pivots 180° between the extended position and a storage position underlying the vehicle underbody.

For example, U.S. Pat. No. 2,838,327 discloses a retractable trailer hitch having a tubular housing welded to a transverse bar secured to a trailer or vehicle, such as by a bracket, to or below the vehicle bumper. A tubular hitch bar is telescopingly, slidably mounted within the tubular housing and carries a hitch ball at an outer end. The slidable hitch bar is rotatable 90° from a first position in which the hitch ball projects vertically upward to a storage position wherein the hitch ball extends laterally to the side of the tubular housing and the slidable hitch bar is telescoped within the tubular housing. In this retracted, storage position, the hitch ball engages an open ended recess formed on one end of the tubular housing. A spring loaded bolt is carried in the tubular housing and is engageable with one of two spaced apertures in the tubular housing and the slidable member to lock the slidable member in either of the first or second positions.

During such slidable extension and retraction, the slidable bar is freely rotatable in any direction about its longitudinal axis. Thus, care must be taken in properly rotating the slide bar in the proper direction and to the proper angular position for alignment of the lock bolt with the aligned apertures in the slide bar and the tubular housing.

U.S. Pat. No. 2,671,674 discloses a similar retractable trailer hitch. In this hitch, a strap bar is secured longitudinally to the vehicle and carries a tubular casting. A draft bar or shaft is telescopingly mounted within the tubular casting and has one flattened end carrying a ball hitch. Longitudinal extension and retraction of the shaft between two positions is stopped at end limits by the ball hitch and a washer carried on the other end of the draft bar.

A pair of lugs extend from one side of the casting and pivotally carry the elongated rod which is pivoted at a center position to the lugs. One end of the rod is pivotally connected to one end of a pin which passes through an opening in the casting and enters a hole in the draft bar to lock the draft bar against movement. In this position, the ball hitch is disposed in a vertical position spaced rearwardly of the bumper.

The opposite end of the rod is pressed away from the casting by a coil spring. Another aperture is formed in the draft bar at right angles to the first aperture and is spaced therefrom. In this manner, when the rod is pressed inward toward the casting against the resilience of the spring, the pin is withdrawn from the first aperture in the draft bar to free the draft bar for sliding movement. The draft bar can then be rotated 90° to bring the ball hitch horizontal and below the bumper so that the draft bar can be pushed ahead allowing the ball to pass under the bumper to a storage position. When the flattened part on the draft bar contacts one end of the casting, one of the apertures in the draft bar will be aligned with the pin for engagement of the pin with the aperture as pressure on the rod is released to lock the rod 24 in the draft bar against further movement.

While this latter hitch provides a retractable and extendable slide bar, with positive locking in both of the extended and retracted positions, the lock mechanism is complicated with respect to the number of separate parts employed in the complete trailer hitch assembly.

Thus, it would be desirable to provide a retractable trailer hitch which enables the ball hitch to be maintained on the slide bar in both the extended and retracted positions without requiring the ball hitch to be removed from the vehicle when the trailer hitch slide bar is moved to the storage, retracted position. It would also be desirable to provide a retractable trailer hitch which is simple in construction with a minimal number of components.

SUMMARY OF THE INVENTION

The present invention is a retractable trailer hitch in which substantially all portions of the trailer hitch are disposed beneath the vehicle bumper and do not project rearwardly of the vehicle bumper to any significant extent when the movable portions of the trailer hitch are in a retracted position.

The hitch comprises a horizontal mounting bar adapted to be attached to a vehicle in a horizontally, laterally extending position with respect to the vehicle. A tubular receiver is carried on the horizontal mounting bar and has an outer end. A tubular slider is telescopingly mounted in the receiver for movement between a first retracted position and a second extended position in which the outer end of the slider extends outwardly from one end of the receiver. Means, are cooperatingly carried on the receiver and the slider for allowing translation of the slider between the first and second positions with respect to the receiver and for simultaneously angularly rotating the slider between two angularly spaced positions with respect to the receiver.

The translating and rotating means preferably comprises a cam slot formed in one of the receiver and the slider and a cam follower formed in other of the receiver and the slider and cooperating with the cam slot for sliding movement of the cam follower along the cam slot. The cam slot and the cam follower cooperate to rotate the slider through an angle of substantially 90° as the slider moves longitudinally between the first and second positions.

The cam is an elongated slot having first and second angularly disposed legs. The first and second legs are disposed substantially 90° from each other. Preferably, the second leg projects substantially perpendicularly from one end of the first leg.

Lock means lock the slider in each of the first and second positions with respect to the receiver. The lock means preferably comprises a single bore formed in one of the receiver and the slider, and first and second spaced bores formed in the other of the receiver and the slider and respectively alignable with the single bore as the slider reciprocates between the first and second positions. A lock pin is slidably insertable through the aligned single bore and one of the first and second bores to lock the slider in one of the first and second positions.

The trailer hitch further comprises a cover disposed over the exposed portions of the horizontal bar and the slider. Movable means are carried on the cover for exposing access to the slider when the slider is in the first, retracted position. The movable means comprises at least one member pivotally attached to the cover and movable between a first position forming a substantially continuous surface extension of the cover and a second pivoted position opening access to the slider.

The retractable trailer hitch of the present invention provides extensible and retractable features to the ball hitch via a movable slider; while at the same time rotating the ball hitch and the slider between two angular positions allowing the ball hitch and slider to be retracted substantially beneath the vehicle bumper without any significant rearward extension beyond the rear surface of the vehicle bumper. A decorative cover may be mounted over the trailer hitch to cover all of the exposed portions of the horizontal tube and slider when the slider is in the retracted position. A portion of the cover is movable to a position enabling access to the slider and ball hitch for movement of the slider to the extended or retracted positions as necessary.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
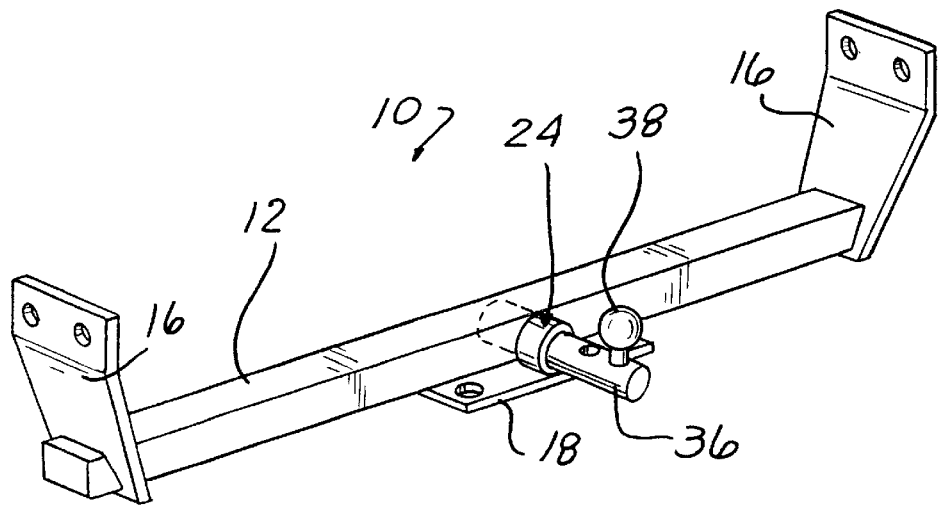
FIG. 1 is a perspective view of a retractable trailer hitch according to the present invention prior to mounting on a vehicle.
Figure 2:
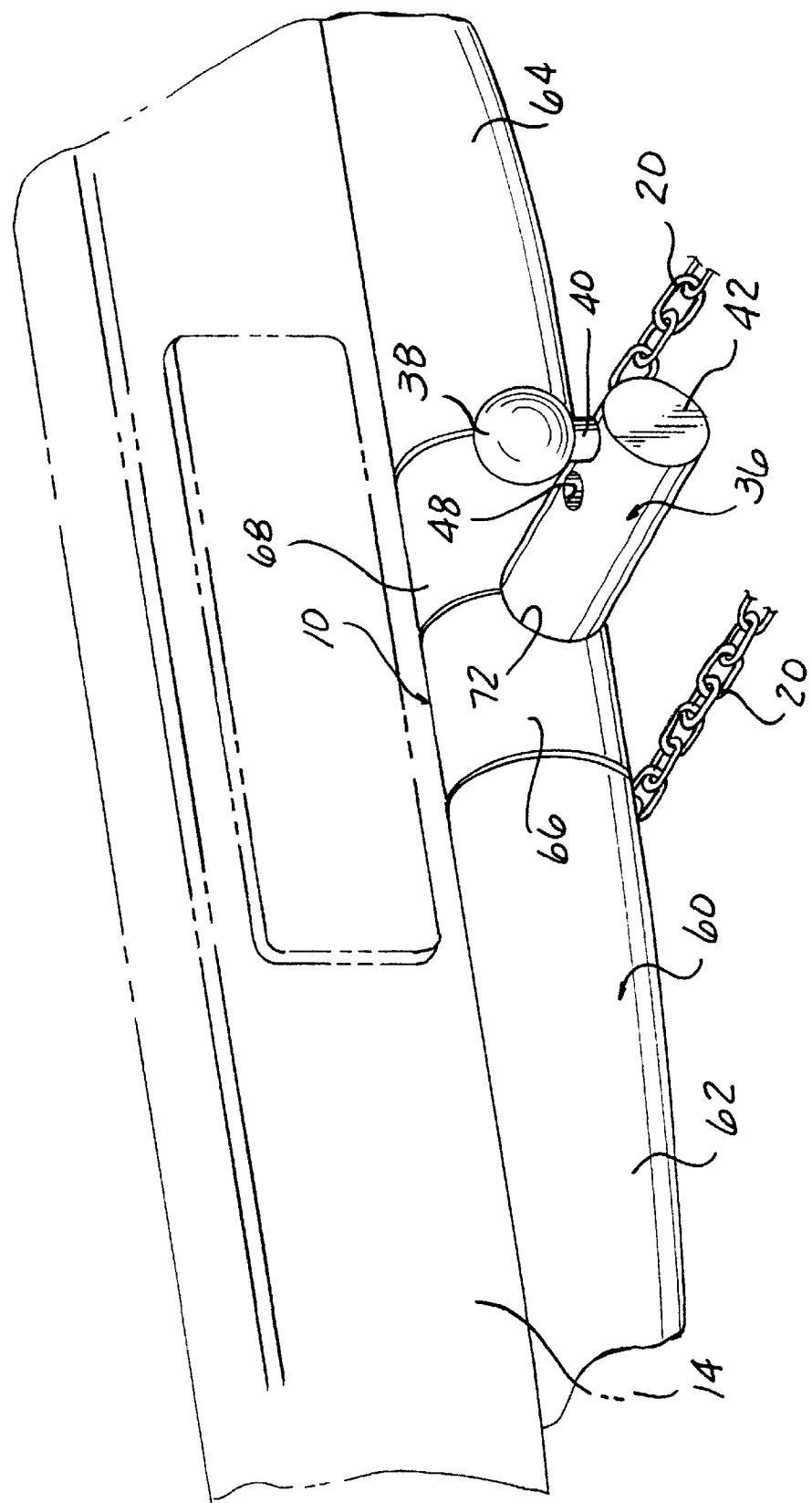
FIG. 2 is a perspective view of the trailer hitch shown in FIG. 1, but depicted in an extended position with the pivotal doors disposed in a closed position on the cover.

Referring now to FIGS. 1–5 of the drawing, there is depicted a trailer hitch 10 constructed in accordance with the teachings of the present invention. The trailer hitch 10 includes a generally horizontally extending mounting member or tube 12 which extends laterally across the width of the vehicle and generally underlies the rear bumper 14 of the vehicle, as shown in FIG. 2. The horizontal tube 12 may have any cross section, such as circular, rectangular, square, with a square tube being the most typical shape in current trailer hitches.

A pair of mounting brackets 16 are fixed to opposite ends of the horizontal tube 12 and are attachable by means of fasteners, welding, etc., to the rear bumper or vehicle body structure. It should also be noted that the horizontal tube 12 could be directly mounted to the vehicle bumper 14 or underlying vehicle structure by means of welding, etc. without the use of the mounting brackets 16.

A plate 18 is secured to the lower surface of the horizontal tube 12 and carries suitable mounts for securing one or two safety chains 20, shown in FIG. 2, to the horizontal tube 12, with the safety chains 20 being attachable at an opposite end to a trailer, not shown.

A bore is formed in the horizontal tube 12, generally centrally between the opposed ends of the tube 12. The bore carries a receiver 24, generally in the form of an elongated cylindrical, tubular member of circular cross section. An end portion of the receiver tube 24, as shown in FIG. 3, extends perpendicularly outward from one side surface of the horizontal tube 12 rearwardly of the vehicle when the trailer hitch 10 is mounted on a vehicle.

A cam slot denoted generally by reference number 28 is formed in the receiver 24. The cam slot 28, in a preferred embodiment, is formed with first and second angularly disposed legs 30 and 32. By example only, the second leg 32 is formed at one end of the first leg 30 and extends generally perpendicularly from the first leg 30. Other shapes for the cam slot 28 may also be employed, such as a curved shape between the outer ends of the first and second legs 30 and 32.

Figure 3:
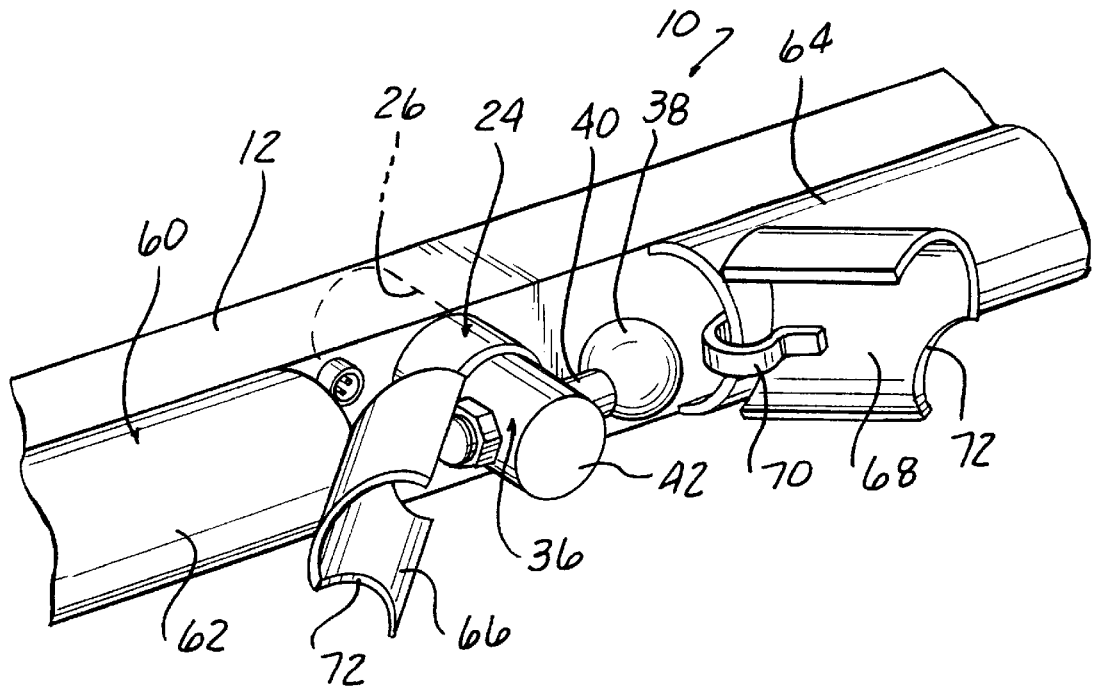
FIG. 3 is a perspective view showing the trailer hitch of FIG. 1 in a retracted position with the pivotal doors in an open position.
Figure 4:
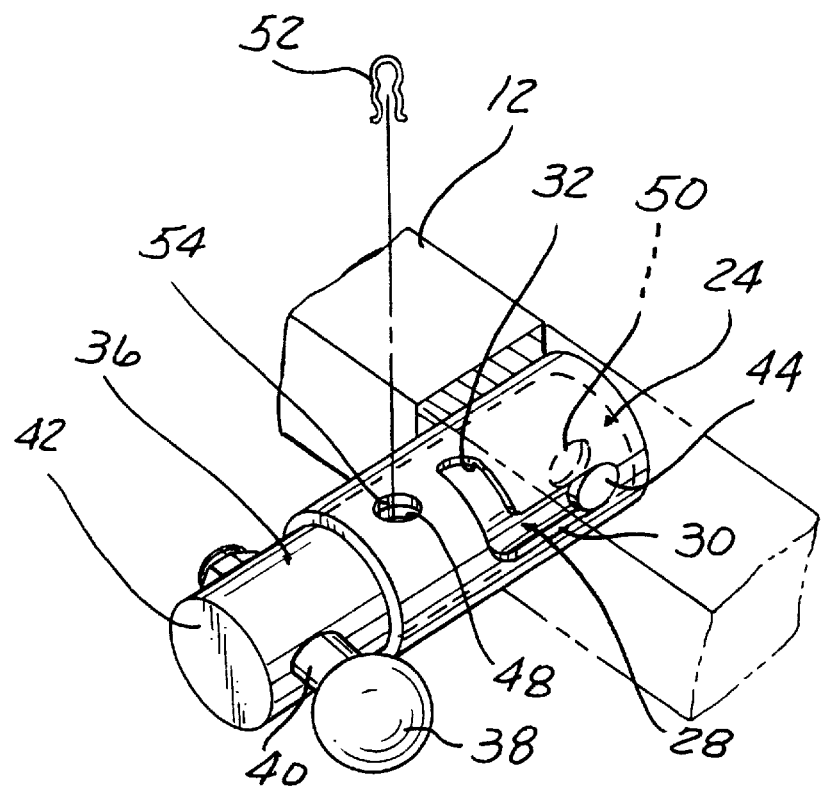
FIG. 4 is a perspective view of the trailer hitch slider and receiver with the slider in a retracted position.
Figure 5:
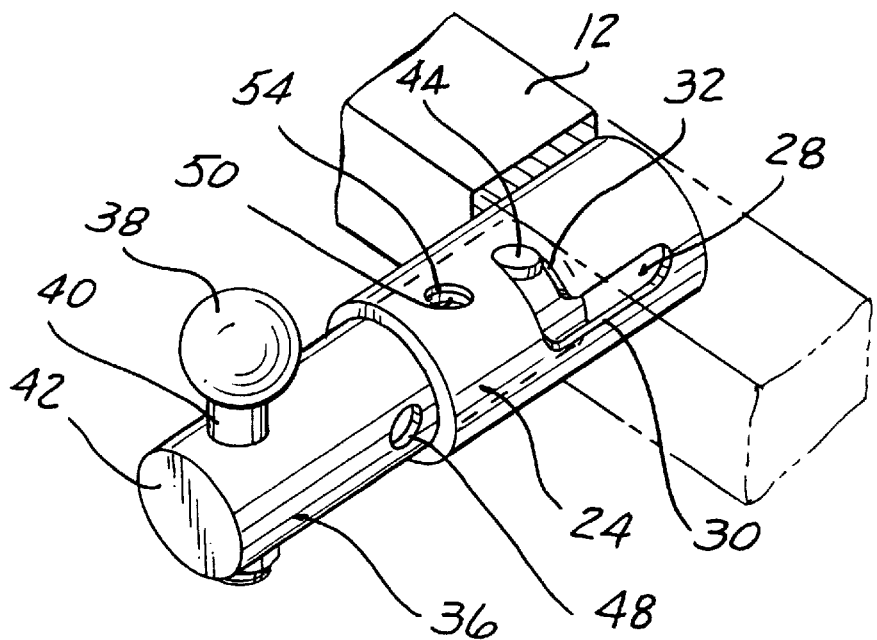
FIG. 5 is a perspective view of the slider and slider receiver with the slider depicted in an extended position.

An inner slider 36, formed of a solid metallic member or a hollow metallic tube, is slidably mounted within the receiver 24 and is movable between a first, retracted position shown in FIGS. 3 and 4 and a second, extended position shown in FIGS. 1, 2 and 5. A conventional hitch ball 38 carried on one end of a shank 40 is securely mounted at an outer end 42 of the slider 36. The shank 40 extends through a bore formed in the slider 36 and is held in position by means of welding or a suitable fastener, such as a threaded nut, etc.

A cam follower 44, in the form of a dowel pin, bolt, etc., is fixedly mounted on the slider 36 between the first end 42 and an opposed second end 46. The cam follower 44 is fixedly secured to slider 36 by means of welding, threads, etc. The cam follower 44 slides along the cam slot 28 between opposite ends of the first and second legs 30 and 32 as shown in FIGS. 4 and 5. As such, the cam follower 44 has a length sufficient to extend at least to and, preferably, slightly beyond the outer surface of the receiver 24.

The interaction of the cam follower 44 and the cam slot 28 controls both the extension and retraction of the slider 36 relative to the receiver 24 as well as rotation of the slider 36 relative to the receiver 24 so as to move the hitch ball 38 between a generally horizontally extending position suitable for storage beneath the vehicle bumper 14, as described hereafter, and a second, vertically, upward extending position for attachment to a trailer socket in a conventional manner.

First and second spaced bores 48 and 50, respectively, are formed in the slider 36 for receiving a lock pin 52, such as a cotter pin, a hair pin, etc., which is releasibly insertable through a single bore 54 at one end of the receiver 24 and one of the bores 48 and 50 depending upon whether the slider 36 is in the retracted position or the extended position.

In operation, with the slider 36 in the first, retracted position shown in FIG. 4, the cam follower 44 is positioned at one end of the first leg 30 of the cam slot 28. In this retracted position, the hitch ball 38 is disposed to one side of the receiver 24 and projects along with the associated shank 40 in a generally horizontal direction thereby allowing easy movement of the hitch ball 38 beneath the vehicle bumper 14 to a storage position in which the hitch ball 38 does not project outwardly at all or to any great extent beyond the rearmost surface of the vehicle bumper 14.

When it is desired to extend the slider 36 for use of the hitch ball 38 to attach a trailer, etc., to the towing vehicle, the lock pin 52 is removed from the single bore 54 in the receiver 24 and the bore 48 in the slider 36. The slider 36 is then pulled rearward from the vehicle bumper 14. This rearward movement advances the cam follower 44 on the slider 36 rearwardly along the first leg 30 of the cam slot 28 until the cam follower 44 strikes the end of the first leg 30. The hitch ball 38 and the slider 36 may then be rotated counter-clockwise approximately 90° to bring the hitch ball 38 to a vertically, upward extending position shown in FIG. 5. The lock pin 52 is then be reinserted through the bore 54 in the receiver 24 and the bore 50 in the slider 36 to lock the slider 36 in the second, extended position.

FIGS. 2 and 3 also depict a unique cover 60 which is mountable over the horizontal tube 12 and covers the receiver 24 at all times when the hitch ball 38 and the slider 36 are in the second, extended position shown in FIG. 2 as well as covering the hitch ball 38 and the slider 36 when the slider 36 is in the first, retracted position shown in FIG. 3.

The cover 60 is preferably in the form of two substantially identical cover members 62 and 64 which are secured to the horizontal tube by means of mechanical fasteners, adhesive, etc. The cover members 62 and 64 are substantially identical and generally have a concave shape. Other shapes, consistent with the shape of the vehicle rear bumper 14 or simply for a esthetic design purpose, may also be employed for the cover members 62 and 64.

The pair of movable members or doors 66 and 68 are pivotally connected to the respective cover members 62 and 64. A conventional hinge 70 may be employed to pivotally attach each movable member or door 66 and 68 to the respective cover member 62 and 64. Alternately, a living hinge may be employed for each door 66 and 68. The doors 66 and 68 may snap together or be otherwise lockable by a latch in the closed position shown in FIG. 2.

As shown in FIGS. 2 and 3, the doors 66 and 68 are pivotally movable from a first, closed position in which a notch 72 formed along one edge of each door 66 and 68 surrounds the slider 36 when the slider 36 is in the second, extended position. The doors 66 and 68 may be pivoted outward relative to the respective cover member 62 and 64 to a second, extended position shown in FIG. 3 allowing access to the slider 36 for extension and retraction of the slider 36 relative to the receiver 24 as described above.

When the slider 36 is in the fully retracted position shown in FIG. 3, the doors 66 and 68 may be closed thereby providing a esthetic, substantially smooth cover over the receiver 24 and the horizontal tube 12.

In summary, there has been disclosed a unique retractable trailer hitch which provides smooth movement of a hitch ball and slider between a first, retracted position in which the hitch ball is disposed substantially underneath the vehicle bumper, and a second extended use position in which the hitch ball is disposed rearward of the vehicle and bumper and projects vertically upward from the slider for attachment to a towing vehicle. The interaction of the cam slot and cam follower on the slider and receiver ensure that the slider is smoothly and easily movable between the extended and retracted positions. This simplifies the construction of the trailer hitch due to the minimal number of components employed therein.

What is claimed is:

1. A trailer hitch mountable on a vehicle, the trailer hitch comprising:

a horizontal mounting bar adapted to be attached to a vehicle in a horizontally, laterally extending position with respect to the vehicle;

a tubular receiver carried on the horizontal mounting member and having an outer end;

a tubular slider telescopingly mounted in the receiver for movement between a first retracted position and a second extended position in which the outer end of the slider extends outwardly from one end of the receiver;

means, cooperatingly carried on the receiver and the slider, for guiding the manual translating of the slider between first and second positions with respect to the receiver and for simultaneously angularly rotating the slider between two angularly spaced positions with respect to the receiver; the translating means including:

a cam slot formed in the receiver; and a cam follower formed in the slider and cooperating with the cam slot for sliding movement of the cam follower along the cam slot during telescoping extension and retraction of the slider relative to the receiver; and lock means for locking the slider in each of the first and second positions, the lock means including:

a single bore formed in one of the receiver and the slider;

first and second spaced bores formed in the other of the receiver and the slider, one of the first and second spaced bores alignable with the single bore when the slider is in the first and second positions; and a lock pin separate from the receiver and the slider, the lock pin manually slidably insertable through the aligned single bore and one of the first and second bores.

2. The trailer hitch of claim 1 wherein the cam slot and the cam follower cooperate to rotate the slider through an angle of substantially 90° as the slider moves longitudinally between the first and second positions.

3. The trailer hitch of claim 1 wherein the cam slot comprises:

an elongated slot having first and second angularly disposed legs.

4. The trailer hitch of claim 3 wherein the first and second legs of the slot are disposed at substantially 90° from each other.

5. The trailer hitch of claim 4 wherein the second leg projects substantially perpendicularly from one end of the first leg of the slot.

6. A trailer hitch mountable on a vehicle, the trailer hitch comprising:

a horizontal mounting bar adapted to be attached to a vehicle in a horizontally, laterally extending position with respect to the vehicle;

a tubular receiver carried on the horizontal mounting member and having an outer end;

a tubular slider telescopingly mounted in the receiver for movement between a first retracted position and a second extended position in which the outer end of the slider extends outwardly from one end of the receiver;

means, cooperatingly carried on the receiver and the slider, for translating the slider between first and second positions with respect to the receiver and for simultaneously angularly rotating the slider between two angularly spaced positions with respect to the receiver; and a cover disposed over the horizontal mounting bar and the slider, the cover including a movable cover portion for exposing access to the slider when the slider is in the first, retracted position.

7. A trailer hitch mountable on a vehicle, the trailer hitch comprising:

a horizontal mounting bar adapted to be attached to a vehicle in a horizontally, laterally extending position with respect to the vehicle;

a tubular receiver carried on the horizontal mounting member and having an outer end;

a tubular slider telescopingly mounted in the receiver for movement between a first retracted position and a second extended position in which the outer end of the slider extends outwardly from one end of the receiver;

means, cooperatingly carried on the receiver and the slider, for translating the slider between first and second positions with respect to the receiver and for simultaneously angularly rotating the slider between two angularly spaced positions with respect to the receiver;

a cover disposed over the horizontal mounting bar and the slider; and moveable means, carried on the cover, for exposing access to the slider when the slider is in the first, retracted position, the moveable means having at least one member pivotally attached to the cover and moveable between a first position forming a continuous surface with the cover and a second pivoted position opening access to the slider.

* * * * *